July 26, 1955  A. GANAHL  2,713,755
DRILL GRINDING MACHINE
Filed March 29, 1951  2 Sheets-Sheet 1
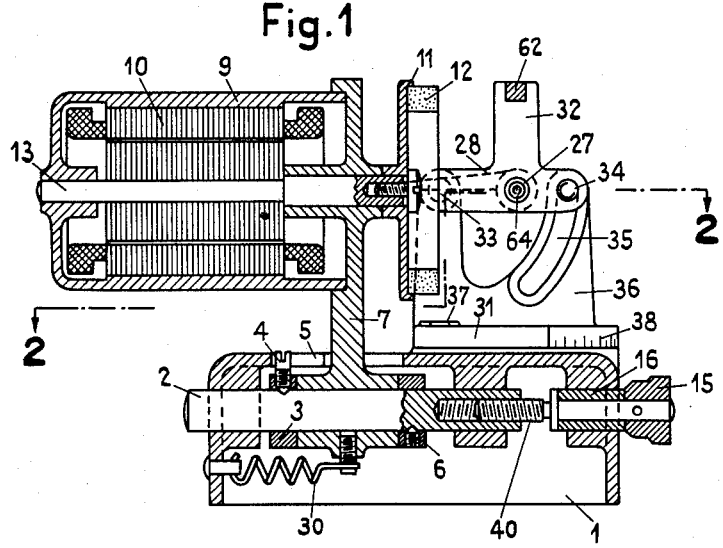
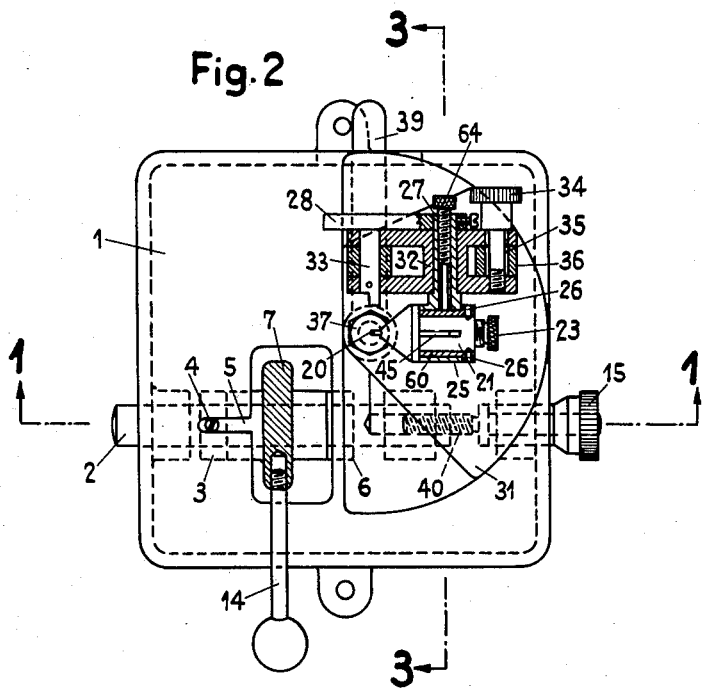
INVENTOR
ALFRED GANAHL
Greene, Pineles & Durr
ATTORNEYS July 26, 1955  A. GANAHL  2,713,755
DRILL GRINDING MACHINE
Filed March 29, 1951  2 Sheets-Sheet 2
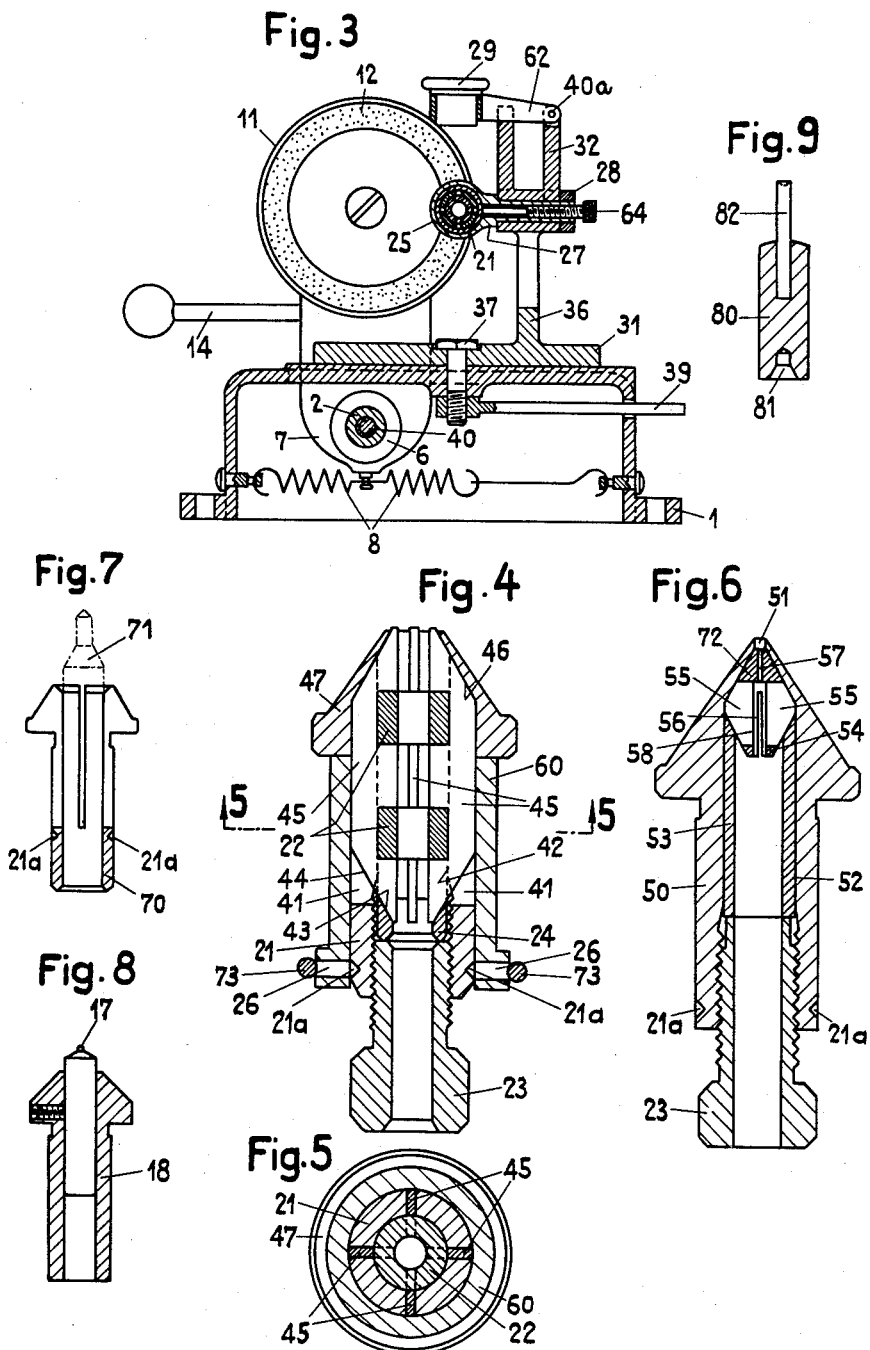
INVENTOR
ALFRED GANAHL
greene, Pinelas & Durr
ATTORNEYS United States Patent Office 2,713,755
Patented July 26, 1955

2,713,755

DRILL GRINDING MACHINE

Alfred Ganahl, Zurich, Switzerland, assignor to Joos Heintz, Zurich, Switzerland Application March 29, 1951, Serial No. 218,247

4 Claims. (Cl. 51—55)

Spiral-drill grinding machines for grinding the tip of the drill are known. These work according to various principles. As shapes producing the cut, cylinders or cones of different taper with variously placed tip are adopted, or flats are ground at the drill tip. The latter is very suitable in particular for small drills, since the ground surfaces can be divided at a cutting lip, so that the drill receives a tip which can penetrate more easily into the material. Since the core thickness of the drill in the case of small drills always increases more in proportion to the diameter, the possibility of dividing up the ground cutting lips is of particular advantage with such drills. One drawback is the necessity of executing four grinding operations corresponding to the four ground surfaces on the drill. This makes the grinding operation long and complicated. In addition to that, it is necessary to have a whole set of collets for holding the drill. The present invention relates to a drill grinding machine which works rapidly, and is easy to attend, the sets of collets being replaced by a few collets suited to the shape of the drill to be ground.

The grinding machine according to the invention is characterised by a holder for the drill to be ground, which holder—in order to set it to the desired relief grinding—is swivellingly supported in a rocker which can be swivelled and adjusted, this rocker in its turn being supported on a table which can be swivelled and adjusted for setting the tip angle, the whole being such that the drill to be ground can be clamped in such a way that its tip coincides with the point of intersection of the axis of rotation of the swivelling table with the axis of the rocker, through which point also the grinding wheel passes.

One form of execution of the object of the invention is illustrated by way of example in the accompanying drawing, where:

Fig. 1 shows a longitudinal section on the line 1—1 in Fig. 2,

Fig. 2 a plan with section on the line 2—2 in Fig. 1,

Fig. 3 a cross-section taken on line 3—3 in Fig. 2,

Fig. 4 an axial section through a collet,

Fig. 5 a section on the line 5—5 in Fig. 4,

Figs. 6 and 7, each in axial section, a holder for a step and centre drill respectively, Fig. 8 a holder for a grinding diamond, and Fig. 9 a gauge to adjust a drill with respect to the drill holder.

In a bedplate 1 a shaft 2 is supported rotatably and axially displaceable. Between two set rings 3 and 6 it carries a support 7 which is held in its middle position by springs 8. As can be seen from Fig. 3, these springs are fixed at one end to the support 7 and at the other end to the bedplate 1. This latter has a slot 5, in which the stud screw 4 screwed into the set ring 3 is displaceable. This screw 4 ensures that the shaft 2 is displaceable, and consequently the support 7. The position of this last is determined by the set screw 15, whose shaft 40 is screwed into the shaft 2. The shaft 40 passes through a bushing 16 of the bedplate 1. The spring 30, attached at one end to the bedplate 1 and at the other end to the support 7, has the purpose of preventing any play between the parts 2 and 40. The casing 9 of the motor 10 is fitted on the support 7. The motor 10 is directly connected to the carrier 11 of the grinding wheel 12 by the shaft 13. Further, on the support 7 an operating lever 14 is fixed, by means of which the support 7 can be given an oscillating movement.

For holding the drill 20 that has to be ground, a holder is provided whose construction can be seen from Fig. 4. In a sleeve 21, provided with slots 41 and an axial bore 42, two cylindrical inserts 22 composed of a flexible material are located. By a set screw 23, a pressure can be exerted through the bush 24 on the inserts 22, whereby the drill 20 is firmly held. When the set screw 23 is screwed into the sleeve 21, the oblique surface 43 of the bushing 24 presses onto the oblique surfaces of the fingers 45. These latter are carried free to swivel in the slots 41 of the sleeve 21. The fingers 45 are displaced not only in the radial but also in the axial direction. By the inclined surface 46 of a clamping head 47 fixed on the sleeve 21 and by the bush 24, the fingers 45 are displaced uniformly inwards along their whole length and the flexible inserts 22 are thus pressed together. As can be seen, the set screw 23 is also bored through axially, so that the drill 20 (Fig. 2) can be passed through it. The flexible insert 22 may consist of any kind of springy material, and in consequence of its very great ability to suit itself to the diameter of the inserted drill it replaces a great number of collets.

The sleeve 21 can be inserted into a bushing 60 which is rotatably supported in a clamping head 25 (Fig. 2). In the bushing 60 two pins 26 are inserted resiliently and held by an annular spring 73. The sleeve 21 can be firmly clamped with the pins 26. The clamping head 25 is rigidly connected to a hollow axle 27, which in its turn is swivellingly supported in a rocker 32. Into the axle 27 a set screw 64 is screwed with its end touching the bushing 60. The screw 64 serves to clamp the bushing 60 firmly in the clamping head 25. The axle 27 carries a lever 28 at its free end. By swivelling this lever 28, the clamping head 25 and with it the holder for the drill 20 are also swivelled. On an arm 62 on the rocker 32, a magnifying glass 29 provided with focussing adjustments is arranged and can be swivelled about an axle 40a. By swivelling the lever 28, the tip of the drill to be ground can be brought into the field of view of the lens 29. By loosening the screw 64 and turning the holder 21 along with the bushing 60, the drill can then be brought into the proper grinding position. Then the bush 60 is again firmly clamped by means of the set screw 64. If the second cutting edge of a drill has to be ground, only the holder 21 is turned through 180°, whilst the bushing 60 does not turn with it. Since the two pins 26 project resiliently into the small recesses 21a of the sleeve 21 (Fig. 4), such a turning is possible. After this turning through 180° the tips of the pins 26 come to lie again in the recesses 21a. In this manner the two drilling positions are accurately displaced by 180° and this can be determined in a very simple way.

The mentioned rocker 32 can be swivelled about an axle 33 and be fixed in any desired position by means of a clamping screw 34 which passes through an arcuate slot 35 in a wall 36 of the swivelling table 31. The table 31 itself can be rotated about an axle 37. The setting of the swivelling table is effected according to the scale 38 on the table, and in fact for drills with lefthand or with righthand threads. By moving the clamping lever 39, the swivelling table 31 can be fixed in any desired position. The lip angle of the drill is determined by the setting of the swivelling table.

For truing the grinding wheel 12, a diamond 17 is used which is held in a holder 18 (Fig. 8). This holder 18 can be inserted into the clamping head 25 instead of the sleeve 21.

The holder shown in Figs. 4 and 5 is suitable for fixing drills with a shaft uniformly thick along its whole length. For clamping so-called stepped drills, use is made of the holder illustrated in Fig. 6; this can also be inserted into the bush 60 of the clamping head 25. This holder has a sleeve 50, whose tip is cone-shaped and provided with an axial bore 51. In the larger bore 52 of the sleeve 50 there is a distance bushing 53, which can be displaced axially by means of the bored-through set screw 23. Within the tip of the sleeve 50 there is a collet 54, which is provided with a bore 58 and slots 55, 56 lying at right angles to each other. At the front, the collet 54 is supported in an insert 72 which is made of flexible material and supports the small diameter of the stepped drill to be ground. The drill to be ground is introduced into the holder 50 by being passed through the screw 23. The front part of the stepped drill has a small diameter and projects through the bore 57 of the flexible insert 72 and outwards through the bore 51, whilst the thicker part lies in the bore 58 of the inserted collet 54. When the screw 23 is screwed in, the segments of the insert formed by the slots 55, 56 are pressed together by the bushing 53 and thus hold the drill tight.

Fig. 7 shows a holder for a centre drill. This holder 70 can also be inserted into the bushing 60 of the clamping head 25 instead of the sleeve 21. The shaft of the drill 71, which is greater in diameter, is held firmly and resiliently in the slotted part of the holder 70. The holder 70 has also recesses 21a into which the tips of the spring pins 26 come to lie.

From the foregoing description it can be seen that, in consequence of the flexible inserts 22, drills—whether spiral drills or centre drills of greatly different diameters—can be ground with one and the same machine. Then the dimension of the relief grinding is determined by the setting of the rocker 32. The approach of the grinding wheel 12 is effected by means of the screw 15. The drill is then clamped in such a manner that its tip lies in the point of intersection of the axis of rotation of the table 31 with the axis of rotation of the rocker 32, through which point also the grinding wheel passes, preferably with its front edge.

It is clear that the drill to be ground may project only a certain distance beyond its holder. In order to obtain this distance quickly and reliably in a simple way, a gauge 80 (Fig. 9) is provided, in which a bore 81 is provided. The drill is preferably pushed so far into the holder that its tip projects too far. Then the gauge 80 is placed over the end of the drill, so that the tip comes to lie within the bore 81, and the drill is pushed back by the gauge into the holder until the gauge comes up against the holder. Then the drill is clamped firmly. With the drift 82 on the gauge 80, the drill can be pushed out of the holder.

In operation, a drill is fitted into the holder of Fig. 4, and partially tightened in place. The gauge 80 is then employed to push the drill back in the holder so that it projects only the distance represented by bore 81 of gauge 80 whereupon the drill is fixed in position by rotating set screw 23. The holder of Fig. 4 is then fixed in clamping head 25 by set screw 64 and the rocker 32 and table 31 are adjusted and fixed in position to give the desired cutting angle. The motor 10 may then be started and moved into grinding position by screw 15. Thereafter any adjustment of the holder, the rocker arm or the table will automatically position the tip of the drill in grinding position since the axis of the rotating table, the axis of the rocker and the tip of the drill all intersect at a single point.

What I claim is:

1. A drill grinding machine comprising a bed plate having a flat top surface with a slot therein, a laterally movable support pivotally mounted on the lower side of said bed plate, said laterally movable support including a portion extending upwardly through said slot, said slot being shaped to permit limited movement of said support with respect to said plate, a motor mounted on that portion of said support which extends above the bed plate so that the rotating shaft of said motor is substantially parallel to said bed plate, screw means rotatably mounted on said bed plate for changing the lateral position of said movable support with respect to said bed plate, means on said support cooperating with said slot to additionally limit the pivotal movement of said support, a grinding wheel attached to the shaft of said motor, means on the top portion of said bed plate for supporting a drill to be sharpened in an adjustable but fixed position with respect to said bed plate whereby a drill to be sharpened is first adjusted to a desired fixed position and said grinding wheel is thereafter moved to grinding position by said screw means.

2. The device as set forth in claim 1 in which said means for supporting a drill comprises, a table rotatably supported on said bed plate with the axis thereof substantially perpendicular to said bed plate, a rocker pivotally supported on said table in a region spaced from the axis of said table and with the pivoting axis of said rocker substantially parallel to said table, a holder for a drill to be ground, means for swively supporting said holder on said rocker, the axes of said table supporting means and said rocker being in the same plane so as to intersect at a point when extended, said holder being spaced from said point of intersection of the extended axes of said table and said rocker and having a bore in which a drill to be sharpened is adapted to be held, the axis of said bore extending in the direction of the said intersection point whereby the axis of a drill to be ground held in the bore of the holder extends toward said point, and whereby the longitudinal position of a drill in said holder may be adjusted so that the tip of the drill coincides with said point, said screw means being adapted to move said grinding wheel so that the grinding surface thereof also passes through said point of intersection.

3. A drill grinding machine comprising a bed plate, a grinding wheel, means on said bed plate to rotatably support said grinding wheel with the axis of the latter substantially parallel to said bed plate, a table, means for rotatably supporting said table on an axis which is substantially perpendicular to said bed plate, a rocker, means for pivotally supporting said rocker on said table in a region spaced laterally from the axis of the table and with the pivoting axis of said rocker substantially parallel to said table, a holder for said drill to be ground, means for swively supporting said holder on said rocker comprising a bush and a clamping head, means for rotatably supporting said clamping head in said rocker, a lever adapted to rotate said last named means, a magnifying glass attached to said rocker, the field of said magnifying glass being spaced from the tip of a drill when held in grinding position in said holder but being in the line of movement of said tip away from grinding position, the axes of said table supporting means and said rocker being in the same plane so as to intersect at a point when extended, said holder being spaced from the point of intersection of said extended axes of said table supporting means and said rocker and having a bore in which a drill to be sharpened is adapted to be held, the axis of said bore extending in the direction of said point of intersection whereby the axis of a drill to be ground held in the bore of the holder extends toward said point and whereby the longitudinal position of a drill in said holder may be adjusted so that the tip of the drill coincides with said point.

4. A drill grinding machine comprising a bed plate, a grinding wheel, means on said bed plate to rotatably support said grinding wheel with the axis of the latter substantially parallel to said bed plate, a table, means for rotatably supporting said table on an axis which is substantially perpendicular to said bed plate, a rocker, means for pivotally supporting said rocker on said table in a region spaced laterally from the axis of the table and with the pivoting axis of said rocker substantially parallel to said table, a holder for said drill to be ground, means for swivelly supporting said holder on said rocker, the axes of said table supporting means and said rocker being in the same plane so as to intersect at a point when extended, said holder extending up to a region adjacent the point of intersection of said extended axes of said table supporting means and said rocker but being spaced from said point and having a bore in which a drill to be sharpened is adapted to be held and at least one elastic insert within said bore adapted to be compressed about a drill to firmly hold the same, the axis of said bore extending in the direction of said point of intersection whereby the axis of a drill to be ground held in the bore of the holder extends toward said point and whereby the longitudinal position of a drill in said holder may be adjusted so that the tip of the drill coincides with said point.

References Cited in the file of this patent

UNITED STATES PATENTS

| | | |
|---|---|---|
| 504,000 | Thiel et al. | Aug. 29, 1893 |
| 714,036 | Roper | Nov. 18, 1902 |
| 748,651 | Reimann | Jan. 5, 1904 |
| 1,546,453 | Oliver | July 21, 1925 |
| 1,941,977 | Evans | Jan. 2, 1934 |
| 2,024,268 | Bausch et al. | Dec. 17, 1935 |
| 2,142,923 | Stocking | Jan. 3, 1939 |
| 2,369,642 | Benning | Feb. 20, 1945 |
| 2,371,676 | Coyne | Mar. 20, 1945 |
| 2,408,618 | Fielding | Oct. 1, 1946 |
| 2,411,591 | Raney | Nov. 26, 1946 |
| 2,502,705 | Choate | Apr. 4, 1950 |
| 2,595,093 | Mouw | Apr. 29, 1952 |

FOREIGN PATENTS

| | | |
|---|---|---|
| 621,087 | Great Britain | Apr. 4, 1949 |